United States Patent
March et al.

(10) Patent No.: US 10,945,314 B2
(45) Date of Patent: Mar. 9, 2021

(54) HIGH POWER EXPOSURE FOR VEHICLE ACCIDENT SIMULATION SYSTEM

(71) Applicant: ATLAS Material Testing Technology GmbH, Linsengericht-Altenhaßlau (DE)

(72) Inventors: Peter March, Frankfurt a. Main (DE); Bernd Rudolph, Alzenau (DE)

(73) Assignee: ATLAS Material Testing Technology GmbH, Linsengericht-Altenhaßlau (DE)

( * ) Notice: Subject to any disclaimer, the term of this patent is extended or adjusted under 35 U.S.C. 154(b) by 0 days.

(21) Appl. No.: 16/194,816

(22) Filed: Nov. 19, 2018

(65) Prior Publication Data

US 2019/0159312 A1 May 23, 2019

(30) Foreign Application Priority Data

Nov. 20, 2017 (EP) .................................... 17202611

(51) Int. Cl.
*H05B 45/00* (2020.01)
*G01M 17/007* (2006.01)
(Continued)

(52) U.S. Cl.
CPC ........ *H05B 45/00* (2020.01); *G01M 17/0078* (2013.01); *G03B 15/02* (2013.01); *H04L 12/10* (2013.01); *H05B 47/10* (2020.01)

(58) Field of Classification Search
CPC ...... B60Q 1/2696; B60Q 1/302; B60Q 1/442; B60Q 1/444; B60Q 1/445; B60Q 1/46; B60Q 1/525; B60Q 2900/30; B62B 15/00; G01B 21/32; G01M 17/00; G01M 17/0078; G01M 17/013; G01M 17/02; G01M 17/08; G01M 7/08; G01M 17/007; G01M 99/00; G01N 3/00; G01N 3/307; H04N 5/23254;
(Continued)

(56) References Cited

U.S. PATENT DOCUMENTS 7,972,036 B1 * 7/2011 Schach ................. F21V 29/763
362/290
2005/0111231 A1 * 5/2005 Crodian ................. H05B 45/10
362/545
(Continued)

FOREIGN PATENT DOCUMENTS

CN 201716171 U 1/2011
JP 62083736 A 4/1987
(Continued)

OTHER PUBLICATIONS

Schmidt (Crash Test Lighting, incorporating; http://www.sts-lighting.de/crashtest.html; Nov. 5, 2016 (Year: 2016).*
(Continued)

*Primary Examiner* — Renan Luque
(74) *Attorney, Agent, or Firm* — Cooper Legal Group, LLC

(57) ABSTRACT

A lighting device (21), comprising a light source (21.1); a power controller (21.2; 21.20) configured to control the supply of electrical power to the light source (21.1) such that upon receipt of a start signal, the supplied electrical power is increased from a first value to a second value, the first value being different from zero and the second value being greater than the first value; and an input (21.4) for supplying the start signal.

14 Claims, 6 Drawing Sheets

(51) Int. Cl.
*H05B 47/10* (2020.01)
*G03B 15/02* (2021.01)
*H04L 12/10* (2006.01)

(58) Field of Classification Search
CPC .... H04N 5/2354; H04N 5/33; H05B 37/0227; H05B 37/0272; H05B 33/0842; Y02B 20/72; G03B 15/02; H04L 12/10
See application file for complete search history.

(56) References Cited

U.S. PATENT DOCUMENTS

| | | | |
|---|---|---|---|
| 2009/0085500 A1* | 4/2009 | Zampini, II | H05B 45/20 315/297 |
| 2010/0103663 A1* | 4/2010 | Kubis | H05B 45/50 362/231 |
| 2013/0027934 A1* | 1/2013 | Velazquez | F21V 23/009 362/249.01 |
| 2013/0229518 A1 | 9/2013 | Reed et al. | |
| 2013/0241421 A1* | 9/2013 | Pringle | H05B 47/10 315/171 |
| 2015/0197182 A1 | 7/2015 | Jones et al. | |
| 2015/0208486 A1* | 7/2015 | Yoon | H05B 37/0227 315/153 |
| 2016/0105597 A1* | 4/2016 | Ke | G03B 15/05 348/362 |
| 2017/0013695 A1* | 1/2017 | Kelley | H05B 33/0854 |
| 2017/0045626 A1* | 2/2017 | Hartman | G08G 1/087 |
| 2017/0219459 A1* | 8/2017 | Liu | G01M 17/013 |
| 2017/0269006 A1* | 9/2017 | Wang | G01V 5/0066 |
| 2018/0091720 A1* | 3/2018 | Edwards | H04N 5/2357 |

FOREIGN PATENT DOCUMENTS

| | | |
|---|---|---|
| JP | 63054709 A | 3/1988 |
| JP | 2005136293 A | 5/2005 |
| JP | 2010231983 A | 10/2010 |
| JP | 2014154438 A | 8/2014 |
| JP | 2017022013 A | 1/2017 |
| KR | 10-0146587 B1 | 8/1998 |

OTHER PUBLICATIONS

"IES 4415" "Onboard LED Controller"; http://www.ies-elektronikentwicklung.de/bilder/SF4415e.pdf; Aug. 2012 (Year: 2012).*
"IES 4412" "LED Controller"; http://www.ies-elektronikentwicklung.de/bilder/SF4412.pdf; Feb. 2012 (Year: 2012).*
EP Search Report cited in Corresponding EP Application No. 17202611.4 dated Apr. 10, 2018.
"Real Vehicle Crash Simulation of High-Speed Camera System Design is Analysed"; Yang Kanghe; China Academic Journal Electronic Publishing House; Automobile Applied Technology, No. 3, 3 pgs., Abstract in English.

* cited by examiner

HIGH POWER EXPOSURE FOR VEHICLE ACCIDENT SIMULATION SYSTEM

RELATED APPLICATIONS

This application claims priority to European Patent Application 17202611.4, filed on Nov. 20, 2017, which is incorporated herein by reference.

TECHNICAL AREA

The present disclosure relates to a lighting device, a lighting apparatus having such a lighting device, in particular for use in a simulation arrangement for motor vehicle accidents, a simulation arrangement for motor vehicle accidents having such a lighting apparatus, and a method for operating a lighting apparatus for a simulation arrangement for motor vehicle accidents.

BACKGROUND

Methods and devices for testing the effects of a motor vehicle accident have been known for a long time and are conventionally known under the abbreviations Crash Test and Crash Test Facility. In such a crash test, a motor vehicle is guided to a predefined collision point with its own or an external drive. The moment of the collision is recorded with special high-speed cameras, which typically have recording frequencies between 1000 and 2000 frames per second, in order to record as many details as possible, so that the effects of the collision can be analyzed very precisely.

The use of such high-speed cameras with their short exposure times requires intensive and homogeneous illumination of the entire vehicle at the time of the collision. For this purpose, a lighting apparatus is provided, which consists of a number of lighting devices or units, most of which are slidably mounted on a rail suspended from a hall ceiling. Each of these lighting devices directs a beam of radiation onto a section of the vehicle. The aim is to achieve the most homogeneous possible spatial illumination of the entire area of the vehicle.

The lighting devices used to illuminate the motor vehicle during image recording must generate a very high luminous flux in order to illuminate the motor vehicle to a sufficient extent, in particular to meet the above requirements of high-speed cameras.

SUMMARY

According to a first aspect of the disclosure, a lighting device comprises a light source and a power controller configured to control the supply of electrical power to the light source such that upon receipt of a start signal the supplied electrical power is increased from a first value to a second value, the first value being different from zero and the second value being greater than the first value, and an input for the supply of the start signal.

According to a second aspect of the disclosure, a lighting apparatus for a simulation arrangement for motor vehicle accidents comprises a plurality of lighting devices according to the first aspect, and a main controller connected to a start line connected to each of the power controllers, the main controller being configured to generate the start signal and supply it to the start line.

According to a third aspect of the disclosure, a simulation arrangement for motor vehicle accidents comprises a lighting apparatus according to the second aspect.

According to a fourth aspect of the disclosure, a method of operating a lighting apparatus for a simulation arrangement for motor vehicle accidents is provided, in which the lighting apparatus comprises a plurality of lighting devices, each lighting device comprising a light source, and in which method the electrical power supplied to the light source is increased from a first value to a second value, the first value being different from zero and the second value being greater than the first value.

The skilled person will recognize additional features and benefits by reading the following detailed description and the enclosed drawings.

BRIEF DESCRIPTION OF THE DRAWINGS

The attached drawings are examples of implementation and, together with the description, serve to explain the principles of the present disclosure and details of the examples of implementation.

DETAILED DESCRIPTION

In the following detailed description, reference is made to the attached drawings which form part of this and in which, for illustration purposes, specific examples of execution are shown in which the present disclosure can be exercised. In this regard, directional terminology such as "top", "bottom", "front", "back", "upper", "lower", etc. is used with reference to the orientation of the figure(s) described. Since components of execution examples of the present disclosure can be positioned in a number of different orientations, the directional terminology is illustrative and in no way restrictive. It is understood that other examples of implementation may be used and structural or logical changes may be made without departing from the scope of protection of the present disclosure. The following detailed description is therefore not to be understood in a restrictive sense and the scope of protection of the present disclosure is defined by the attached claims.

To the extent that the following description, patent claims or drawings express that elements like circuit elements are "connected", "electrically connected" or "electrically coupled" to each other, this may mean that the said elements are coupled directly, i.e. without any other elements in between. However, it can also mean that the mentioned elements are not directly coupled to each other and that further elements are coupled between the mentioned elements. Insofar as identical reference signs are used in the figures, these refer to identical or functionally identical elements, so that in these cases the description of these elements is not repeated.

Figure 1:
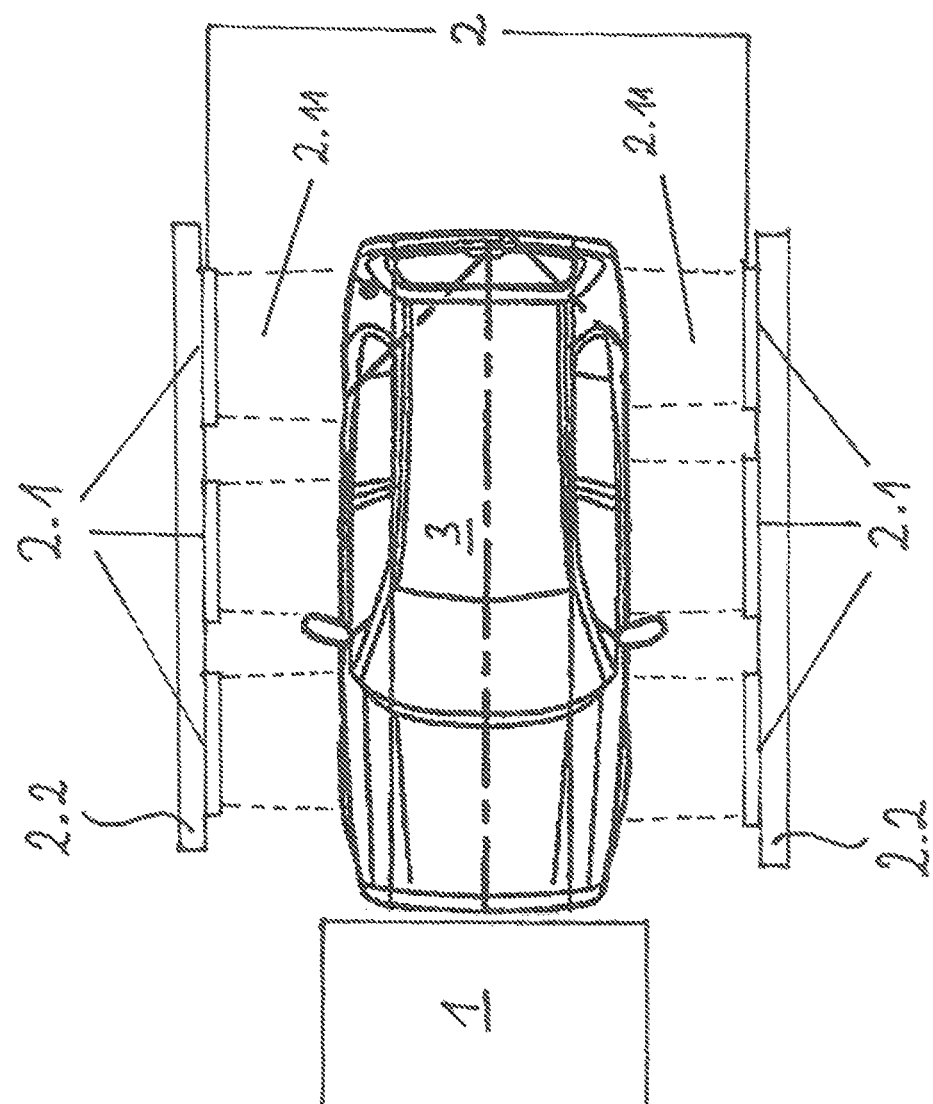
FIG. 1 shows a schematic top view of a simulation arrangement for motor vehicle accidents.

FIG. 1 shows in schematic and simplified form the essential components of a crash test facility. The chosen illustration is only intended to illustrate once again the starting point for the present disclosure. A crash test facility 10 has a collision point 1, a lighting device 2 and a plurality of high-speed cameras (not shown) which are intended to record the moment of impact of a motor vehicle 3 with collision point 1. Collision point 1 may be a fixed immovable obstacle or another vehicle. The lighting device 2 may comprise a plurality of lighting devices or units 2.1 which are attached, for example, to a rail 2.2 which in turn is suspended from the ceiling of the hall. For example, three lighting units 2.1 are shown. Each of the lighting units 2.1 emits a beam of radiation 2.11 in the direction of the motor vehicle 3. The lighting units 2.1 may, for example, contain halogen gas discharge lamps operated by special ballasts or light-emitting diodes (LEDs), in particular white light LEDs.

Figure 2:
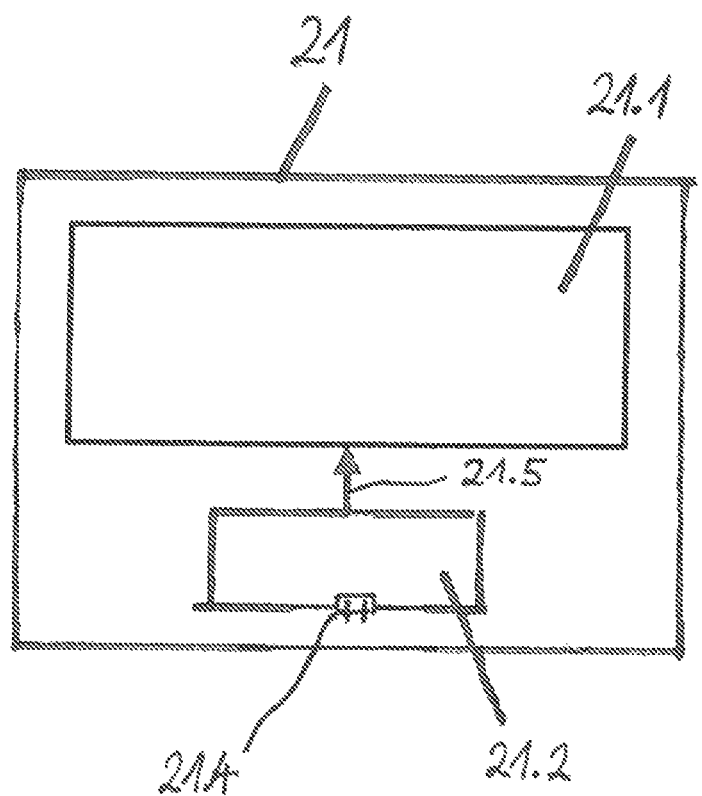
FIG. 2 shows a schematic block diagram of an example of a lighting device according to the first aspect.

FIG. 2 shows a schematic block diagram of an example of a lighting device according to the first aspect. A lighting unit 21 according to the first aspect has a light source 21.1, at least one power regulator 21.2, in particular a current regulator connected to the light source 21.1, and an input 21.4 for the supply of a start signal. One output of the power controller 21.2 is connected to the light source 21.1 via a line 21.5. The light source 21.1 may have a plurality of light emission diodes (LEDs), in particular white light LEDs 21.11.

According to an example of the lighting device according to the first aspect, the power controller 21.2 is configured to control the supply of electrical power, in particular electric current, to the light source 21.1 in such a way that after reception of the start signal, the supplied electrical power is increased from a first value to a second value, the first value being different from zero and the second value being greater than the first value. The power controller 21.2 can draw the electrical power or the electric current from the public power supply (not shown). Via line 21.5 the light source 21.1 is then supplied with electric current according to the first value or the second value. As will still be seen, each lighting unit 21 may also contain a plurality of power controllers 21.2.

According to an example of the lighting device according to the first aspect, the second value can be, for example, a maximum value of the electrical power that can be supplied to the light source and marked with 100%. Such a maximum value of the electrical power can depend, for example, on the thermal load capacity of the LEDs 21.11 and/or on the performance of the power controller 21.2. Independently of this, the first value of the electrical power can lie in a range between 10% and 50%, in particular between 20% and 40%, preferably about 30%, of the second value, i.e. about the maximum value of the electrical power, in particular the electrical current.

According to an example of the lighting device according to the first aspect, the light source 21.1 has a plurality of light emitting diodes (LEDs) 21.11, in particular white light LEDs, which can be arranged in the form of a matrix. Alternatively, light source 21.1 may also be provided by a halogen gas discharge lamp.

According to an example of the lighting device according to the first aspect, it has a luminous intensity of >50,000 lumens in the operating state, in particular >100,000 lumens.

According to an example of the lighting device according to the first aspect, it has a light output power of >1 kW, in particular >5 kW, in the operating state.

Figure 4:
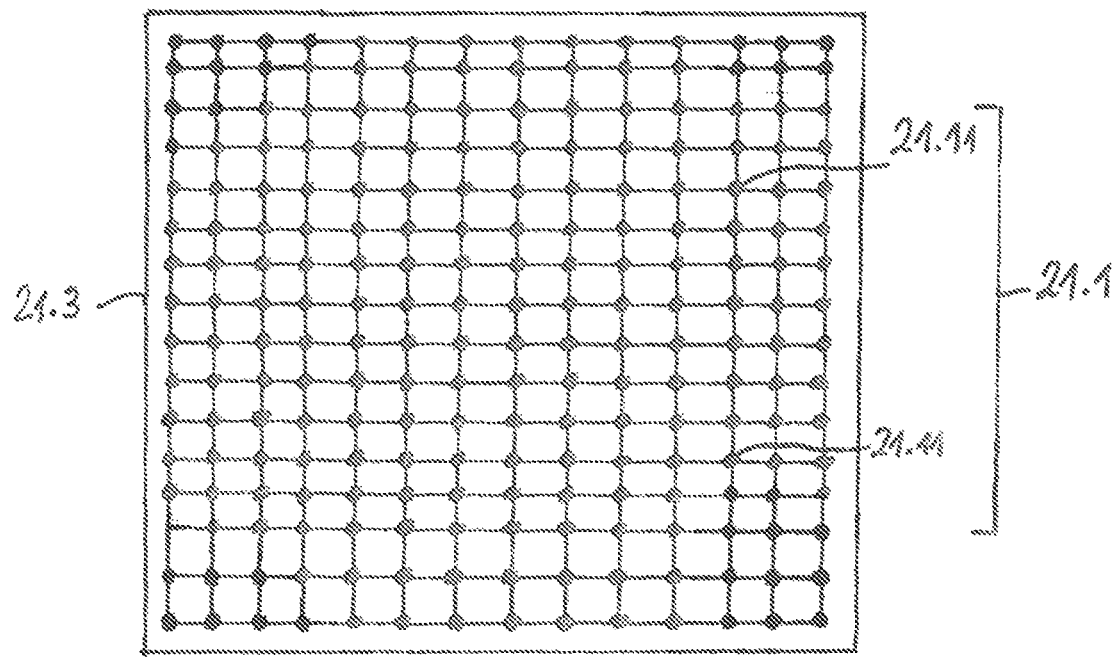
FIG. 4 shows a top view of an example of a light source of an example of a lighting device according to the first aspect, the light source comprising a matrix-like array of LEDs.

As shown in FIG. 4, the matrix arrangement of LEDs 21.11 can be fixed inside a flat rectangular housing 21.3, which has four side walls and a rear wall (not visible).

Figure 3:
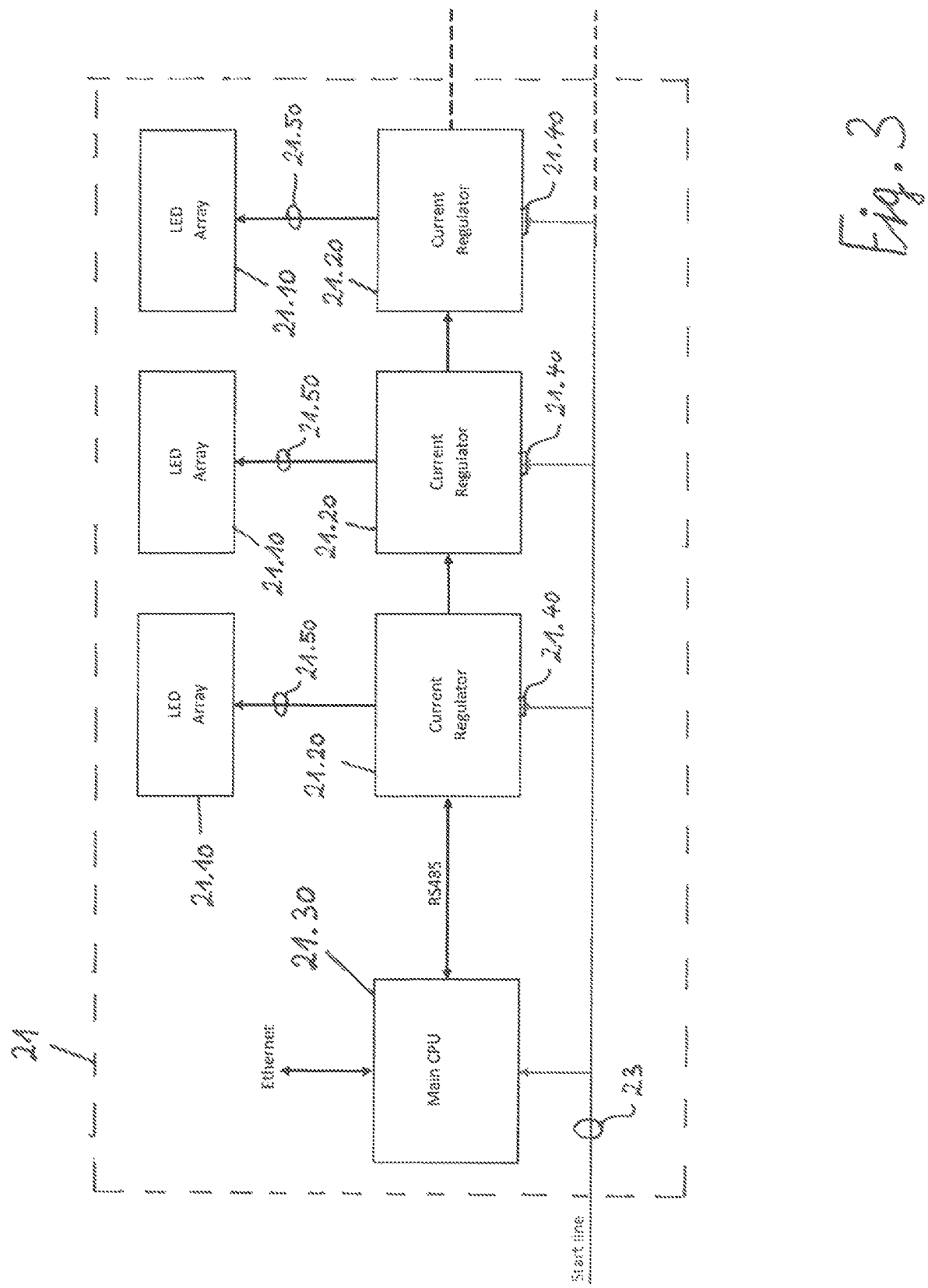
FIG. 3 shows a schematic block diagram of an example of a lighting device according to the first aspect, in which the lighting device comprises several groups of LEDs and associated power controllers each, and a light source controller connected to each of the power controllers.

FIG. 3 shows a block diagram of a lighting device according to the first aspect comprising a plurality of power regulators each connected to a group of LEDs. The lighting unit 21 of FIG. 3 has a plurality of groups 21.10 of LEDs 21.11 and a corresponding plurality of power regulators 21.20, each group 21.10 of LEDs 21.11 being connected to and controlled by one of the power regulators 21.20. Each of the power regulators 21.20 can be designed as the power regulator 21.2 of FIG. 1. Referring to FIG. 4, groups 21.10 of LEDs 21.11 can be formed in different ways. For example, groups 21.10 can be several rows or columns of the matrix of LEDs 21.11 lying next to or below each other. Alternatively, groups 21.10 can also be formed from partial matrices of the entire matrix, for example by dividing the entire matrix into four quadrants.

For example, a light source 21.1 can have a total number of 150 to 250, in particular approx. 200 LEDs, which is divided into blocks of 15-20 LEDs, in particular approx. 18 LEDs, which are then each controlled by a power controller.

According to an example of a lighting device 21 according to the first aspect, the lighting device 21 also has a light source control device 21.30, which is connected to the one or more power controllers 21.20. The light source control unit 21.30 may be provided by a microcontroller. The light source controller 21.30 may be configured to interrogate parameters and operating data from the power controllers 21.20, where the parameters and operating data include, for example, the temperature of the LEDs 21.11, the temperature of the power controllers 21.20, the temperature of the light source controllers 21.30, or the light output at the first value of the electrical power.

Each of the power controllers 21.20 has an input which can be identical to the input 21.4 of the lighting device 21 of FIG. 2 and which can be or is connected to the start line 23. One output of each of the power controllers 21.20 is connected to an input of one of the groups 21.10 of the light source 21.1, in particular to the LEDs 21.11 of the corresponding group 21.10, via a line 21.50 corresponding to line 21.5 of FIG. 2.

Figure 5:
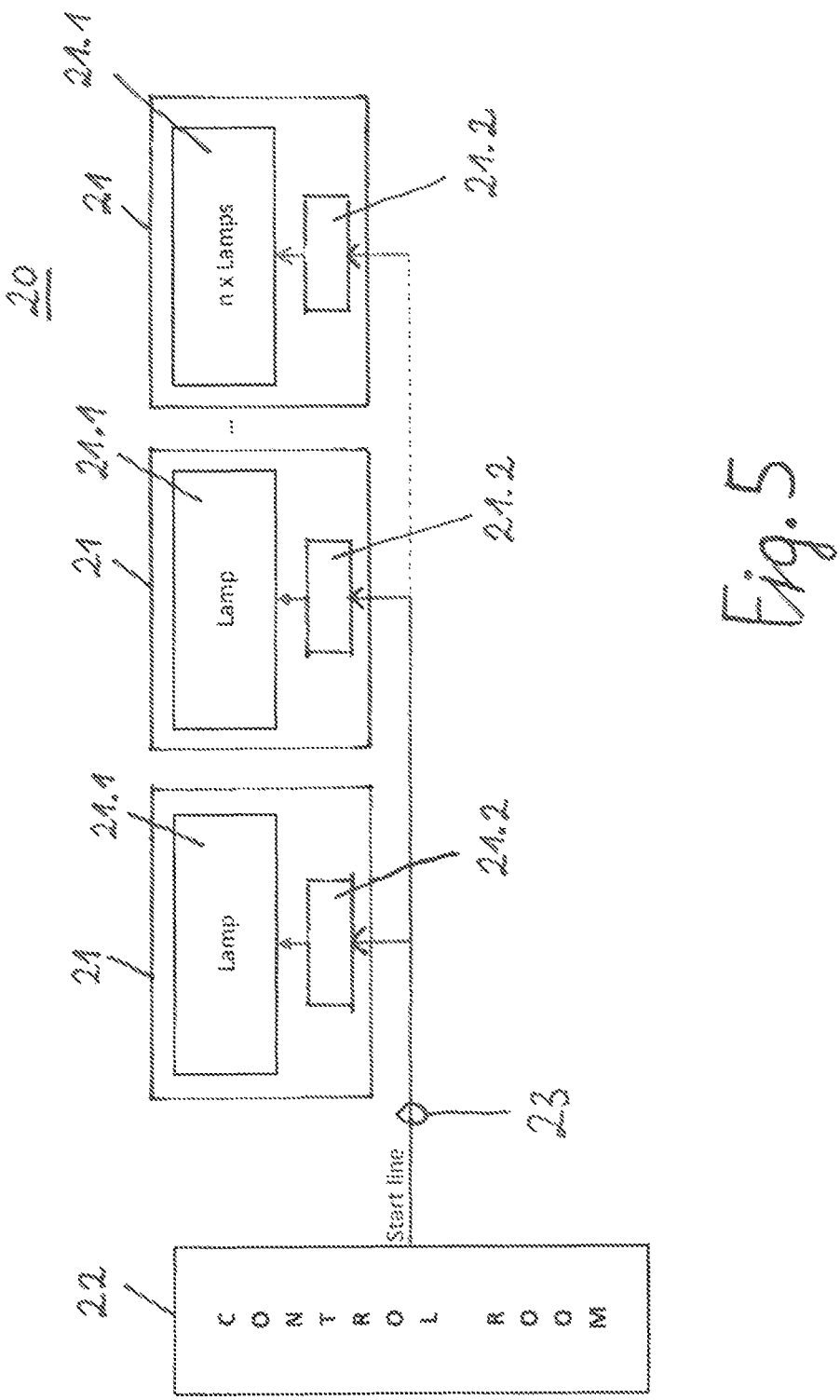
FIG. 5 shows a schematic block diagram of an example of a lighting apparatus according to the second aspect, comprising a number of n lighting devices.

FIG. 5 shows an example of a lighting apparatus according to the second aspect. The lighting apparatus 20 of FIG. 5 has a plurality of lighting devices 21, each lighting device 21 having a light source 21.1 and at least one power regulator 21.2. The lighting device 21 can be designed according to one of the examples of FIG. 2 or FIG. 3.

The lighting apparatus 20 further comprises a main control means 22 connected to a start line 23 connected to each of the power controllers 21.2, wherein the main control means 22 is configured to generate the start signal and supply it to the start line 23.

According to an example of the lighting apparatus 20, the lighting devices 21 may be connected to an Ethernet network connected to the main control device 22, whereby, for example, exactly one Ethernet line may be connected to each lighting device 21, in particular to the light source control device 21.30 of the lighting device 21. The light source control unit 21.30 can then be connected to the power controllers 21.20 via an RS485 bus system which transmits the parameters and operating data to the Ethernet network.

The start signal can be triggered manually by an operator or automatically. In the latter case, the start signal can be triggered, for example, by a light barrier or an electrical contact on the simulation arrangement for motor vehicle accidents. It may be provided that the start signal cannot be triggered if at least one power controller supplies parameters or operating data of the respective associated light source 21.10 via the RS485 bus system that do not fulfil certain conditions or lie outside predetermined ranges and thus indicate a lack of operational readiness or inadequate performance of the associated light source. Accordingly, the start signal is only triggered if all light sources or all LED groups report sufficient operational readiness by means of the transmitted parameters or operating data.

The start signal can be fed simultaneously to the lighting units 21 to initiate the increase in electrical power from the first value to the second value. The start signal can, for example, be a (rectangular) trigger signal or a (24V) rectangular signal whose voltage level and/or time duration must be sufficient to be detected by the electrical circuit of the power controllers 21.2 or 21.20 (time duration e.g. 1 ns-100 ms). The time duration of the trigger or rectangular signal is in any case preferably shorter than the specified time span during which the light source is supplied with the second value of the electrical power.

The start line 23 can be given by a single-wire or a two-wire line. According to an example of a two-wire line, three ground lines and two signal lines are required. The two signal lines each transmit the useful signal with opposite polarity. This configuration can be used to suppress common mode interference. As shown in FIG. 3, the starting line 23 has a corresponding number of branches to the power controllers 21.20. The inputs 21.40 of the power controllers 21.20 are designed in such a way that they can be connected to a start line as described above.

The light source control unit 21.30 can also have an input which is connected to the start line 23. The start signal can trigger an event counter in the light source control unit 21.30, for example.

According to an example of the lighting device 20, each power controller 21.2 is configured to maintain the supplied electrical power at the second value for a predetermined period of time and to reduce it back to the first value after the predetermined period of time has elapsed. The specified time period is selected so that a crash test can be performed and the high-speed cameras can take pictures during the crash test. It can, for example, be greater than 5 s or in a range between 5 s and 30 s, especially between 10 s and 20 s, for example at about 15 s.

According to a third aspect of disclosure, a simulation arrangement for motor vehicle accidents has a lighting apparatus according to the second aspect of disclosure. The simulation arrangement may in particular be connected to the main control device of the lighting apparatus, whereby a signal triggering the start signal is generated by the simulation arrangement by means of a light barrier or an electrical contact and transmitted to the main control device. It may also be provided that the lighting apparatus, in particular the main control device, is synchronized with one or more of the high-speed cameras.

A fourth aspect of disclosure relates to a method of operating a lighting apparatus for a simulation arrangement for motor vehicle accidents, the lighting apparatus comprising a plurality of lighting devices, each lighting device comprising a light source, in particular a plurality of light emission diodes (LEDs). In the method, the electrical power supplied to the light source is increased from a first value to a second value, the first value being different from zero and the second value being greater than the first value. According to an example of the method of the fourth aspect, the electrical power is maintained at the second value for a predetermined period of time and the lighting devices are monitored before and after the predetermined period of time and parameters and operating data of the light source and a power controller driving the light source are collected.

According to an example of the method of the fourth aspect, a start signal is generated and simultaneously supplied to the lighting devices to initiate the increase in electrical power from the first value to the second value. According to another example, the start signal is triggered by a light barrier or an electrical contact on the simulation arrangement for motor vehicle accidents.

Further examples of a method according to the fourth aspect can be formed by combining with features and embodiments described above in connection with the lighting device or the lighting apparatus.

Figure 6:
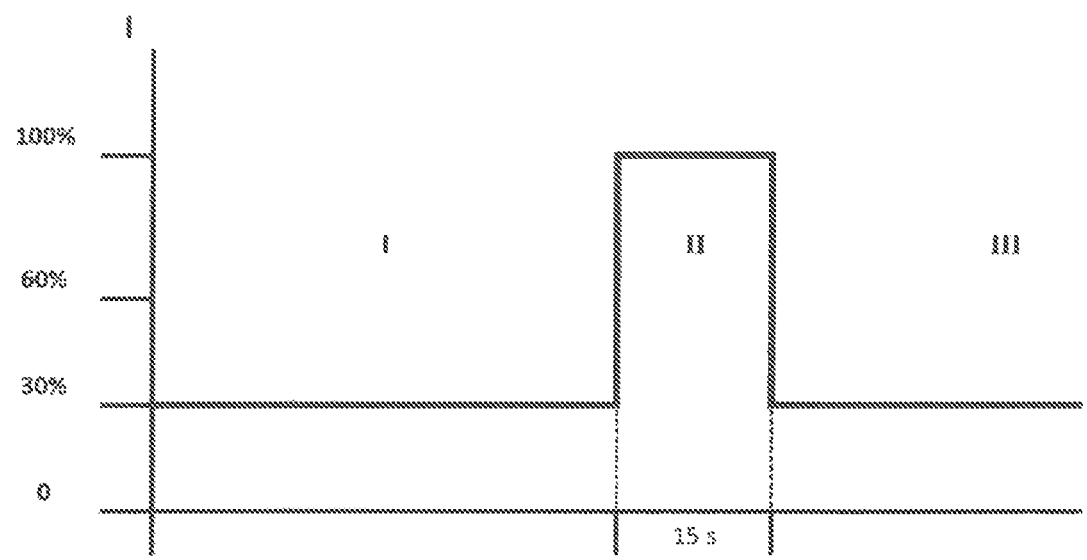
FIG. 6 shows an exemplary current-time diagram which shows the time dependence of the current supplied to the LEDs before, during and after the execution of a crash test.

FIG. 6 shows a current-time diagram representing the time dependence of the current I supplied to the light source. The current-time diagram has three phases I-III. In the first phase I, the current supplied to the light sources is 30% of the maximum value of 100% of the current. The second phase II is initiated by the start signal supplied to the lighting devices 21.2 or 21.20. The electrical current can be increased from 30% to 100%, for example, over a period of time ranging from 1 μs to 100 μs, more specifically from 1 μs to 50 μs, more specifically from 1 μs to 20 μs. During the second phase II, which in this example has a duration of 15 s, the current supplied to the lighting devices is increased to the maximum value of 100% and the crash test is carried out. In the third phase III, the current I supplied to the lighting devices is reduced again to the initial value of e.g. 30% after completion of the crash test or after the end of the recordings by the high-speed camera.

Although specific embodiments have been presented and described in this description, it is clear to the skilled person in the field that the specific embodiments shown and described can be replaced by a variety of alternative and/or equivalent implementations without deviating from the scope of protection of the present disclosure. This application is intended to cover any adaptations or changes to the specific embodiments discussed herein. Therefore, it is provided that this disclosure is limited only by the claims and their equivalents.

The invention claimed is:

1. A lighting device, comprising:
a light source, wherein the light source comprises a plurality of light-emitting diodes (LEDs) arranged in an overall matrix and a plurality of LED groups, wherein each LED group of the plurality of LED groups comprises a subset of the plurality of LEDs and is formed as a partial matrix of the overall matrix;
a plurality of power regulators, wherein each LED group of the plurality of LED groups is connected to one power regulator of the plurality of power regulators, and each power regulator of the plurality of power regulators is configured to control a supply of electrical power to the respective LED group such that upon receipt of a start signal, the supplied electrical power is increased from a first value to a second value, the first value being different from zero and the second value being greater than the first value, and wherein each power regulator of the plurality of power regulators is further configured to maintain the supplied electrical power at the second value for a predetermined period of time and to lower the supplied electrical power back to the first value after the predetermined period of time has elapsed, wherein the predetermined period of time is greater than 5 s;

a light source control connected to each power regulator of the plurality of power regulators and configured to interrogate parameters and operating data from the power regulators, wherein each power regulator of the plurality of power regulators and the light source control are configured to concurrently receive the start signal; and an input for supplying the start signal.

2. The lighting device according to claim 1, in which the parameters and operating data comprise one or more of the following data: a temperature of the LEDs comprised within the LED groups, a temperature of the power regulators, or a light output at the first value of the electrical power.

3. The lighting device according to claim 1, in which the light source control is connected to the power regulators via an RS485 bus system.

4. The lighting device according to claim 1, in which the first value of the electrical power is in a range between 20% and 40% of the second value of the electrical power.

5. A lighting apparatus for a simulation arrangement for motor vehicle accidents, comprising:
a plurality of lighting devices according to claim 1; and
a main controller connected to a start line connected to the light source control and to the power regulators, the main controller being configured to generate the start signal and supply the start signal to the start line.

6. The lighting apparatus according to claim 5, in which the main controller is connected to the light source control and to the plurality of lighting devices by an Ethernet.

7. A simulation arrangement for motor vehicle accidents with the lighting apparatus in accordance with claim 5.

8. The simulation arrangement for motor vehicle accidents according to claim 7, in which the simulation arrangement is connected to the main controller, wherein a signal triggering the start signal is generated by the simulation arrangement by a light barrier or an electrical contact and transmitted to the main controller.

9. A method of operating a lighting apparatus for a simulation arrangement for motor vehicle accidents, the lighting apparatus comprising a plurality of lighting devices, each lighting device of the plurality of lighting devices comprising:
a light source, wherein the light source comprises a plurality of light-emitting diodes (LEDs) arranged in an overall matrix and a plurality of LED groups, wherein each LED group of the plurality of LED groups comprises a subset of the plurality of LEDs and is formed as a partial matrix of the overall matrix,
a plurality of power regulators, wherein each LED group of the plurality of LED groups is connected to one power regulator of the plurality of power regulators, and
a light source control connected to each power regulator of the plurality of power regulators and configured to interrogate parameters and operating data from the power regulators,
wherein the method comprises:
concurrently supplying each power regulator of the plurality of power regulators and the light source control with a start signal to initiate an increase in electrical power supplied to the LED groups from a first value to a second value,
increasing the electrical power supplied to the LED groups by the power regulators from the first value to the second value, the first value being different from zero and the second value being greater than the first value; and
maintaining the electrical power at the second value for a predetermined period of time, the predetermined period of time being greater than 5 s.

10. The method according to claim 9, in which each lighting device of the plurality of lighting devices is monitored before and after the predetermined period of time, and the parameters and operating data of the power regulators are collected by the light source control.

11. The method according to claim 9, in which the start signal is generated and concurrently supplied to the plurality of lighting devices to initiate the increase in the electrical power from the first value to the second value.

12. The method according to claim 11, in which the start signal is triggered by a light barrier or an electrical contact on the simulation arrangement.

13. The lighting device according to claim 1, wherein the partial matrices are formed by four quadrants of the overall matrix.

14. The lighting device according to claim 1, further comprising a housing, wherein the plurality of LED groups are disposed within the housing.

* * * * *